J. H. SAGER.
AUTOMOBILE BUMPER.
APPLICATION FILED FEB. 24, 1912.
1,108,625.
Patented Aug. 25, 1914.
Fig. 1.
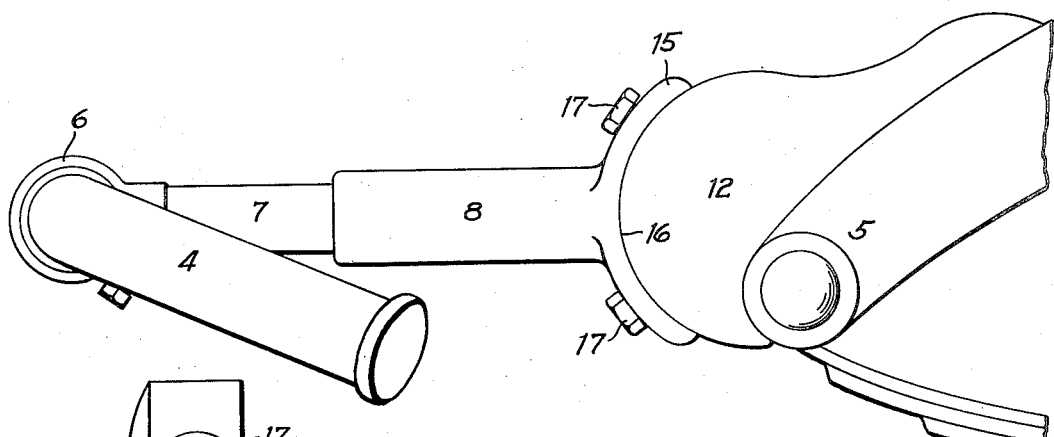
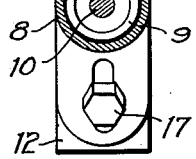
Fig. 3.
Fig. 2.
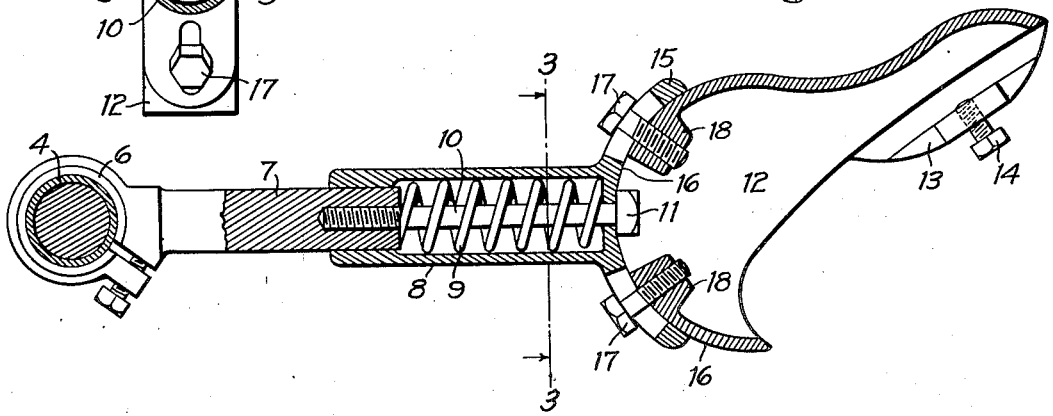
Witnesses:
C. W. Carroll
L. Thon
Inventor:
James H. Sager
by his attorneys
Osgood, Davis & Dorsey

UNITED STATES PATENT OFFICE.

JAMES H. SAGER, OF ROCHESTER, NEW YORK, ASSIGNOR TO J. H. SAGER COMPANY, OF ROCHESTER, NEW YORK, A CORPORATION OF NEW YORK.

AUTOMOBILE-BUMPER.

1,108,625.     Specification of Letters Patent.     Patented Aug. 25, 1914.

Application filed February 24, 1912. Serial No. 679,719.

*To all whom it may concern:*

Be it known that I, JAMES H. SAGER, citizen of the United States, and resident of Rochester, in the county of Monroe and State of New York, have invented certain new and useful Improvements in Automobile-Bumpers, of which the following is a specification.

This invention relates to automobile-bumpers of the type in which a horizontal bumper-bar is carried in front of the front-wheels of an automobile, being supported by means adapted to be attached to the frame of the automobile.

In devices of the kind in question it is common to fix the bumper-bar to the forward ends of arms or slides projecting forwardly, in substantially horizontal position, from base-members which are adapted to be clamped, or otherwise secured, to the forward extremities of the side frame-members of the automobile.

The object of the present invention is to produce a simple and rigid construction by which the bumper, when applied to automobiles of various designs, may have its parts so positioned, in every case, as most effectually to resist the strain of a collision against the bumper-bar.

To this end the invention consists in an arrangement by which the forwardly-extending members or bar-supports are connected with the base-members by means of coöperating convex and concave portions permitting relative angular adjustment of these parts in vertical planes, whereby the supports may be arranged in any position either horizontal or inclined, which may be found most effective for the purpose in question.

In the drawings:—Figure 1 is a side-elevation of a bumper embodying the present invention, as applied to an automobile-frame. Fig. 2 is a vertical section through one of the supports and the base-member on which it is mounted; and Fig. 3 is a section on the line 3—3 in Fig. 2.

The general construction of the illustrated bumper is not novel. The bumper comprises the usual horizontal cross-bar 4 with backwardly-curved extremities, which is adapted to be carried in front of the front-wheels of the automobile and to be supported by means connecting it with the forward extremities 5 of the side frame-members of the vehicle. The bumper-bar is clamped in heads 6 on the forward ends of stems 7, which are slidingly mounted in sleeves 8. A compression-spring 9 is carried in each sleeve 8, and a rod 10 is screwed into the rear end of the stem 7 and passes through an opening in the rear end of the sleeve, being provided with a square head 11 by which it may be screwed into the stem, and which acts as a stop to retain the stem in the sleeve against the pressure of the spring.

The general form of the illustrated base-member is similar to that disclosed in my pending application, Serial No. 656,013, filed October 21, 1911. As disclosed in said application, it is in the form of a hollow casting, having lateral webs 12 of which the edges are curved to seat upon the end of the side frame 5 of the automobile and overhang its forward extremity, one of these webs being provided with a lug 13, which projects beneath the upper web of the frame-member and is provided with a set-screw 14, by which the base-member may be clamped to this web, thus fixing it in place upon the frame.

The present invention resides particularly in the connections between the sleeve 8 and the base-member 12. The forward extremity of the base-member is formed upon a circular convex curve, and the rear extremity of the spring-sleeve has a corresponding segmental form, being provided with upwardly- and downwardly-projecting lugs 15 curved concavely to fit against the surface 16 of the base-member. These lugs are slotted to receive set-screws 17, which enter bosses formed in the base-member. When these set-screws are loosened the segmental portion of the spring-sleeve may slide upwardly or downwardly upon the surface 16, thus changing the angular position of the bar-support as a whole, while still retaining a firm seat upon the base-member. The parts are clamped in adjusted position by means of the set-screws 17.

The pivotal arrangement just described, while readily adjustable, is rigid and secure against movement by any of the shocks encountered by the bumper, owing to the extensive curved surfaces which are in engagement between the supports and the base-members, and the device thus has substantially the rigidity of the usual integral construction, while being readily adaptable, without modification in its design, to automobiles having frame-members of various degrees of curvature at their forward extremities.

As shown in Fig. 2, the forward portion of the base-member is cut away between the bosses 18, thus affording free play for the rod 10 within the base-member, when the bumper is subjected to a shock by which the spring 9 is compressed. The square head 11, by its engagement with the flat lateral webs of the base-member, fixes the rod against rotation, and thus prevents it from unscrewing from the stem 7 when the parts are in assembled position.

My invention is not limited to the embodiment thereof hereinbefore described and illustrated in the accompanying drawings, but may be embodied in various other forms within the nature of the invention as it is defined in the following claims.

I claim:—

1. In an automobile bumper, the combination of a base-member formed to seat upon the forward extremity of the side frame-member of an automobile and provided with a hollow forwardly-convex portion and an opening in the front-wall thereof; a sleeve having a rear extremity fitting against the convex surface of said front-wall and covering said opening; means for fixing the sleeve adjustably upon said surface, whereby vertical angular adjustment of the sleeve is permitted; a slide-member mounted in the sleeve and adapted, at its forward end, to support a bumper-bar or the like, the rear-end of the slide-member projecting through the rear-end of the sleeve and into the opening in the base-member, and the hollow forwardly-projecting portion of the base-member affording space in which the slide-member may move when it is forced rearwardly; and a spring interposed between the sleeve and the slide-member and tending to hold the latter in its normal forward position within the sleeve.

2. An automobile bumper having, in combination, a transverse bumper-bar, hollow base-members formed to seat upon the forward extremities of the side frame-members of an automobile and provided, at their forward extremities, with circularly-curved surfaces and with central openings therein, supports extending forwardly from the base-members and carrying the bumper-bar, each of said supports comprising a stem fixed to the bumper-bar, a sleeve in which the stem is slidingly mounted, a spring inclosed within the sleeve, a rod extending rearwardly, from the stem, through the rear end of the sleeve and into the central opening in the base-member, and lugs extending upwardly and downwardly from the sleeve and forming a segmentally-curved surface seated upon the curved surface of the base-member; and means for clamping said lugs adjustably against said surface.

JAMES H. SAGER.

Witnesses:
D. GURNEE,
C. S. DAVIS.